(12) United States Patent
Tanaka

(10) Patent No.: US 12,521,074 B2
(45) Date of Patent: Jan. 13, 2026

(54) X-RAY COMPUTER TOMOGRAPHY APPARATUS

(71) Applicant: CANON MEDICAL SYSTEMS CORPORATION, Otawara (JP)

(72) Inventor: Ryotaro Tanaka, Nasushiobara (JP)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 183 days.

(21) Appl. No.: 18/436,230

(22) Filed: Feb. 8, 2024

(65) Prior Publication Data

US 2024/0285245 A1    Aug. 29, 2024

(30) Foreign Application Priority Data

Feb. 24, 2023   (JP) ................................. 2023-026984

(51) Int. Cl.
  *A61B 6/00*   (2024.01)
  *A61B 6/03*   (2006.01)
  *A61B 6/04*   (2006.01)

(52) U.S. Cl.
  CPC ............ *A61B 6/4447* (2013.01); *A61B 6/032* (2013.01); *A61B 6/0407* (2013.01); *A61B 6/4476* (2013.01)

(58) Field of Classification Search
  CPC ..... A61B 6/4447; A61B 6/032; A61B 6/0407; A61B 6/4476; A61B 6/03; A61B 6/4429; A61B 6/4435; A61B 6/035
  See application file for complete search history.

(56) References Cited

U.S. PATENT DOCUMENTS

2017/0340296 A1\* 11/2017 Shin ....................... A61B 6/027
2023/0240632 A1\* 8/2023 Levasseur ............ A61B 6/0407
378/198

FOREIGN PATENT DOCUMENTS

JP      2015-198769 A    11/2015

\* cited by examiner

*Primary Examiner* — Courtney D Thomas
(74) *Attorney, Agent, or Firm* — Oblon, McClelland, Maier & Neustadt, L.L.P.

(57) ABSTRACT

An X-ray computer tomographic apparatus according to an embodiment includes a gantry, a bearing, a driver, and a stand. The gantry rotatably supports a rotation unit on which an X-ray tube is mounted. The bearing is connected to the gantry and includes an inner ring with a plurality of teeth on an inner circumferential surface and an outer ring that is connected to an outer circumference of the inner ring via a plurality of rolling elements. The driver causes the inner ring to rotate via the teeth. The driver is mounted on the stand and the stand is connected to the outer ring and is provided on a floor surface.

5 Claims, 7 Drawing Sheets

X-RAY COMPUTER TOMOGRAPHY APPARATUS

CROSS-REFERENCE TO RELATED APPLICATIONS

This application is based upon and claims the benefit of priority from Japanese Patent Application No. 2023-026984, filed on Feb. 24, 2023, the entire contents of which are incorporated herein by reference.

FIELD

Embodiments described herein relate generally to an X-ray tomography apparatus.

BACKGROUND

X-ray computed tomography apparatuses ("X-ray CT apparatuses" below) capable of capturing images of a subject in a spine position state or in a standing position state have been known. The X-ray CT apparatus has a mechanism that causes a gantry main unit including an imaging system to rotate while image capturing on the subject in the spine position state ("spine position imaging" below) and image capturing on the subject in the standing position ("standing position imaging" below). For visibility of the subject in the standing position imaging and convenience in moving the subject from a stretcher to a table, the gantry main unit (also referred to as a scanner unit) sometimes is held and supported on a stand on one side.

In order to realize an X-ray CT apparatus capable of both the standing position imaging and the spine position imaging, a drive mechanism for tilting the scanner unit by 90 degrees is necessary. The drive mechanism of the X-ray CT apparatus that holds and supports the scanner unit on one side and that is capable of both the standing position imaging and the spine position imaging ("one-side-holding CT apparatus" below) is configured using a bearing 162 in order to support the weight of a scanner unit 121 on a stand 133 as illustrated in FIG. 6. For example, the drive mechanism connects a shaft that is supported on the bearing 162 to a gear and drives the gear with a motor, thereby realizing a tilt of the scanner unit 121 by 90 degrees.

In the standing position imaging, because the scanner unit 121 has a nature of moving in a vertical direction, reducing a thickness TS (a length of the scanner unit 121 along an opening 15 in a perpendicular direction in the scanner unit 121) makes it possible to ensure strokes of the scanner unit 121 (an area of move of the scanner unit 121 along the vertical direction) in the standing position imaging. The bearing 162 that supports the scanner unit 121 in tilting the scanner unit 121 is subject to a moment load of the scanner unit 121. Because of the nature, a larger diameter of the bearing 162 is preferable. On the other hand, in the standing position imaging, the ceiling height and the thickness TS of the scanner unit 121 in the standing position imaging have a restriction on strokes of up-and-down moves of the scanner unit 121. For this reason, a design in which the thickness of the scanner unit 121 is reduced is required.

As illustrated in FIG. 7, the scanner unit 121 is held on an inner ring of the bearing 162 via a shaft 24. The stand 133 is connected to the inner ring of the bearing 162. In the structure of the drive mechanism, the scanner unit 121 sometimes vibrates because of a backlash of the gear caused by the motor. For this reason, a brake for inhibiting the backlash is required. To arrange such parts of the mechanism, it is necessary to arrange the parts of the mechanism in a direction TS of the thickness of the scanner unit 121 as illustrated in FIG. 7 or in a direction of a depth of the stand 133 (a Y-direction). In other words, a driver 22 and a brake 26 are arranged in the direction TS of the thickness of the scanner unit 121. As illustrated in FIG. 7, the driver 22 includes a motor 222 and a shaft 224 that transmits rotation of the motor 222 to a gear 226. In addition to this, as illustrated in FIG. 7, the brake 26 includes a motor 262 and a shaft 264 that transmits rotation caused by the motor 262 to a gear 266. For this reason, as illustrated in FIG. 7, the tilt mechanism (the bearing) has a thickness larger than that of the scanner unit 121. For this reason, such a configuration as that illustrated in FIG. 7 sometimes places a restriction on up-down strokes of the scanner unit 121.

In order not to place a restriction on up-and-down strokes of the scanner unit 121, a necessity of reducing the diameter of the bearing 162 occurs. Reducing the diameter of the bearing 162 is disadvantageous to the moment load of the scanner unit 121. It is also possible to arrange the driver 22 and the brake 26 horizontally. This however causes necessity of increasing the stand 133 horizontally in order to ensure a space in which the brake 26 moves. As described above, the CT conventional one-side-held apparatus is subject to some restrictions in design.

DETAILED DESCRIPTION

An X-ray computer tomography apparatus according to an embodiment includes a gantry, a bearing, a driver, and a stand. The gantry rotatably supports a rotation unit with an X-ray tube mounted thereon. The bearing is connected to the gantry and includes an inner ring with a plurality of teeth on an inner circumferential surface and an outer ring that is connected to an outer circumference of the inner ring via a plurality of rolling elements. The driver causes the inner ring to rotate via the teeth. The stand has the driver mounted thereon, is connected to the outer ring, and is provided on a floor surface.

An embodiment of an X-ray computed tomography apparatus ("X-ray CT apparatus" below) will be described below with reference to the accompanying drawings. The X-ray CT apparatus according to the embodiment further has a structure enabling a change in the posture of the gantry between a standing image capturing state in which an image of a subject in a standing position can be captured and a spine position imaging state in which an image of a subject in a spine position can be captured and further has a structure that holds and supports a gantry main unit on one side. In the following embodiment, parts denoted with the same reference numbers perform the same operations, and redundant description will be omitted as appropriate.

The embodiment is not limited to an X-ray CT apparatus. For example, according to the embodiment, in the case of a medical image diagnosis apparatus including a gantry, it is possible to use technical features of the embodiment. The medical image diagnosis apparatus is, for example, a nuclear medicine diagnosis apparatus, such as a magnetic resonance imaging (MRI) apparatus, a positron emission tomography (PET) apparatus or a single photon emission computed tomography (SPECT) apparatus, a composite apparatus including the X-ray CT apparatus and the nuclear medicine diagnosis apparatus, or a composite apparatus including the MRI apparatus and the nuclear medicine diagnosis apparatus.

First Embodiment

Figure 1:
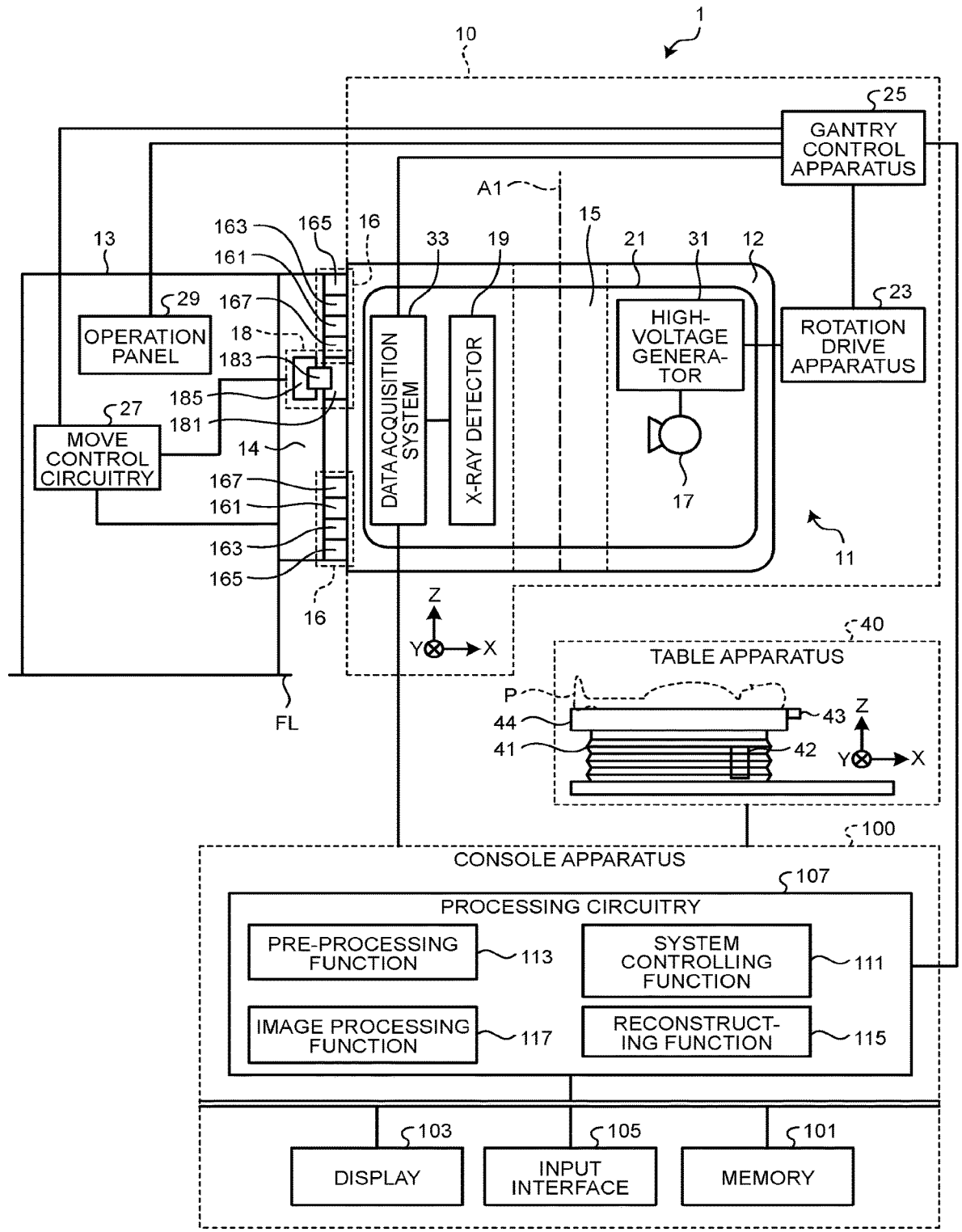
FIG. 1 is a diagram illustrating an example of a configuration of an X-ray CT apparatus according to a first embodiment.

FIG. 1 is a diagram illustrating an example of a configuration of an X-ray CT apparatus 1 according to a first embodiment. As illustrated in FIG. 1, the X-ray CT apparatus 1 includes a gantry apparatus 10, a stand 13, a table apparatus 40, and a console apparatus 100. For example, the gantry apparatus 10, the stand 13, and the table apparatus 40 are set in a CT examination room and the console apparatus 100 is set in a control room that is adjacent to the CT examination room. The gantry apparatus 10, the stand 13, the table apparatus 40, and the console apparatus 100 are connected to each other in a wired or wireless manner such that they can communicate with each other. The gantry apparatus 10, the stand 13, and the table apparatus 40 operate according to operations from a user via the console apparatus 100 or operations from the user via an operation unit that is provided in the gantry apparatus 10 or the table apparatus 40. Note that, in the first embodiment, an axial direction perpendicular to a floor surface FL, that is, a vertical direction is defined as a Z-axis direction and two directions that are orthogonal to the Z-axis direction and that are orthogonal to each other are defined as an X-axis direction and a Y-axis direction, respectively.

The gantry apparatus 10 is a scan apparatus having a configuration for performing X-ray CT imaging on a subject P in the standing position or the spine position. The console apparatus 100 is a computer that controls the gantry apparatus 10. The gantry apparatus 10 includes the gantry (also referred to as a gantry main unit) 11, the stand (also referred to as a column) 13, a rotation drive apparatus 23, and a gantry control apparatus 25. The gantry 11 includes an imaging system that relates to capturing an image of the subject P and the opening 15 into which the subject P can be inserted. The stand 13 supports the gantry 11 such that the orientation of the opening 15 can be changed between the perpendicular direction and a horizontal direction and such that the gantry 11 is movable along the perpendicular direction. The stand 13 may be referred to as a stand unit. The stand 13 is provided on the floor surface FL of the examination room.

The gantry 11 has the opening 15 that forms an imaging space that relates to capturing an image of the subject P. Note that the gantry 11 may be referred to as a scanner unit. The scanner unit 11 rotatably supports the rotation frame 21 (that may be also referred to as a rotation unit) on which an X-ray tube 17 is mounted. The gantry 11 is an approximately cylindrical structure in which the opening 15 is formed. As illustrated in FIG. 1, the gantry 11 houses the X-ray tube 17 and an X-ray detector 19 that are arranged such that the X-ray tube 17 and the X-ray detector 19 are opposed to each other with the opening 15 interposed in between. The X-ray tube 17 and the X-ray detector 19 are included in an imaging system that relates to capturing an image of the subject P in the first embodiment. Note that the imaging system may further include a data acquisition system (DAS) 33, a high-voltage generator 31, a collimator, and a wedge. In other words, the gantry 11 includes the imaging system that relates to capturing an image of the subject P.

Figure 2:
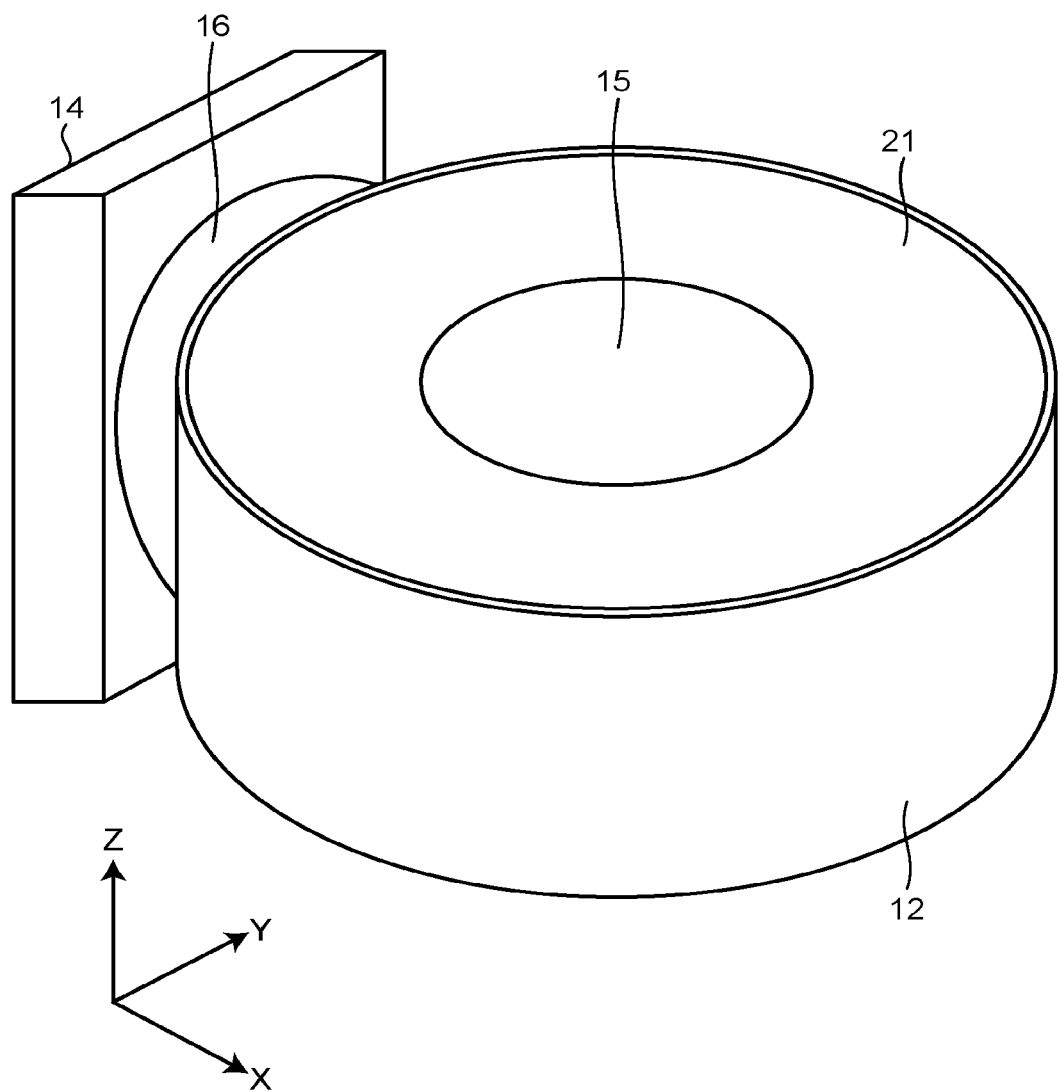
FIG. 2 is a perspective view illustrating an example of a positional relationship between a fixation unit, a gantry move mechanism, an opening, a bearing, and a rotation frame according to the first embodiment.

FIG. 2 is a perspective view illustrating an example of a positional relationship between a fixation unit 12, a gantry move mechanism 14, the opening 15, a bearing 16, and a rotation frame 21. As illustrated in FIG. 2, the rotation frame 21 is supported on the fixation unit. The fixation unit 12 is supported by the gantry move mechanism 14 in the stand 13 via the bearing 16.

The gantry 11 is supported on the stand 13 via the gantry move mechanism 14 and the bearing 16 such that the gantry 11 is movable in the vertical direction along the stand 13. The gantry 11 is supported on the stand 13 via the gantry move mechanism 14 and the bearing 16 such that the orientation of the opening 15 can be changed between the vertical direction and the horizontal direction. For example, in the standing position imaging state, the orientation of the opening 15 corresponds to a direction along a rotation axis A1. For example, the rotation axis A1 is in the vertical direction in the standing position imaging state and the rotation axis A1 is in the horizontal direction in the spine position imaging state.

The gantry 11 includes the fixation unit 12 that is formed of metal, such as aluminum, and the rotation frame 21 that is supported by the fixation unit 12 rotatably about the rotation axis A1 via a bearing, or the like, in the case of the standing position imaging state. The fixation unit 12 has a fixation unit opening in which the subject P can be arranged and rotatably supports the rotation frame 21 on which the X-ray-tube 17 is mounted. The fixation unit opening corresponds to the opening 15 that is provided in the fixation unit 12. As for the opening, when the opening 15 with which the fixation unit 12 is provided is focused, the opening 15 is referred to as the fixation unit opening below as required. The fixation unit 12 is also referred to as, for example, a main frame or a fixed frame. A rotation unit 21 is referred to as the rotation frame 21. An annular electrode (not illustrated in the drawings) is provided in a part of contact between the main frame 12 and the rotation frame 21. A conductive wiper (not illustrated in the drawings) is attached to the part of contact in the main frame such that the wiper slides on and makes contact with the annular electrode.

The stand 13 is a base that supports the gantry 11 separately from the floor surface FL. The stand 13 has a column-like shape, such as a cylindrical shape or a prismatic shape. The stand 13 is attached to a side surface part of the gantry 11. The stand 13 is provided on, for example, the floor surface FL of the examination room where the subject P is examined. The stand 13 includes the gantry move mechanism 14. The gantry move mechanism 14 supports the gantry 11 with the rotation axis A1 of the opening 15 being oriented approximately perpendicularly to the floor surface such that the fixation unit 12 is movable in the vertical direction. Accordingly, the stand 13 supports the fixation unit 12 movably in the vertical direction. The bearing 16 supports the fixation unit 12 such that the fixation unit 12 is rotatable and movable on a tilt axis that is perpendicular to the vertical direction. A driver 18 is mounted on the stand 13. Specifically, the driver 18 is mounted on the gantry move mechanism 14 in the stand 13. The gantry move mechanism 14, the bearing 16, and the driver 18 will be described below.

Figure 3:
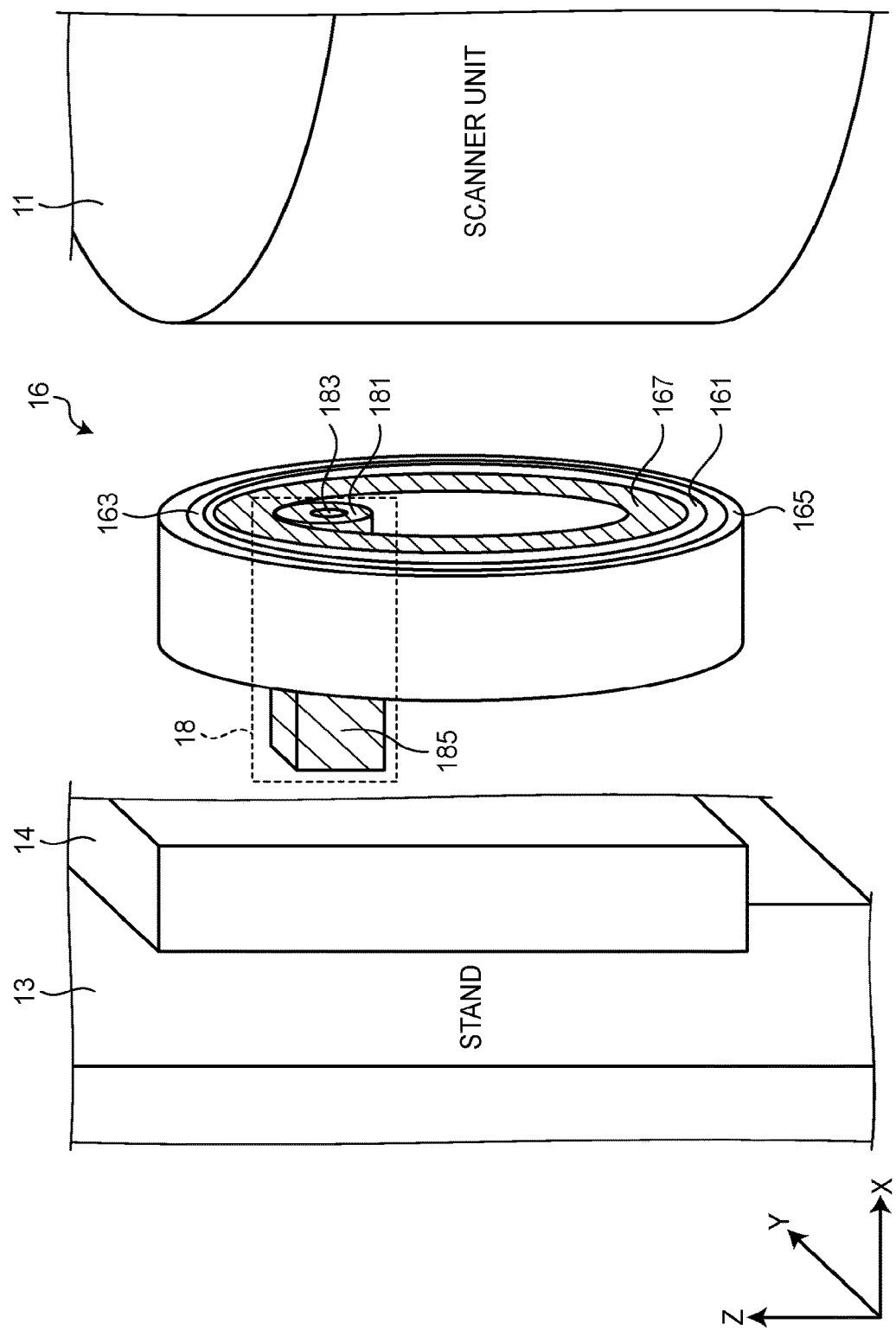
FIG. 3 is a perspective view illustrating an example of a positional relationship between a gantry, a stand, the gantry move mechanism, the bearing and a driver according to the first embodiment.

FIG. 3 is a perspective view illustrating an example of a positional relationship between the gantry 11, the stand 13, the gantry move mechanism 14, the bearing 16 and the driver 18. FIG. 3 illustrates the stand 13, the gantry move mechanism 14, the bearing 16, and the gantry 11 separately such that the positional relationship is understood easily. According to FIG. 3, a driver gear 181 in the driver 18 is engaged with internal teeth 167 at an upper end in the vertical direction; however, the driver gear 181 is not limited to this. The position of engagement between the internal teeth 167 and the driver gear 181 can be set freely as long as the position is within a space (opening) surrounded by the internal teeth 167.

Typically, the stand 13 is provided on one side part of the gantry 11 via the gantry move mechanism 14 and the bearing 16. The stand 13 has the column-like shape; however, the first embodiment is not limited to this. For example, the stand 13 may have any shape, such as a U-shape, as long as the stand 13 can hold at least the side part of the gantry 11 on one side. Note that the stand 13 is not limited to being set on the floor surface FL of the examination room, and one end of the stand 13 may be fixed to the floor surface FL and the other end of the stand 13 may be fixed to the ceiling of the examination room.

The stand 13 supports the gantry 11 via the gantry move mechanism 14 and the bearing 16 rotatably about a horizontal axis parallel to the floor surface (referred to as the tilt axis below) with the rotation axis A1 being between the vertical direction and the horizontal direction. The gantry move mechanism 14 includes, for example, a translation guide along the vertical direction, a block that is movable on the translation guide, and a motor that causes the block to move ("vertical move motor" below).

Specifically, the stand 13 is provided with the translation guide in the gantry move mechanism 14. The block that is movable along the translation guide is provided with the bearing 16. Because of driving by the vertical move motor under the control of move control circuitry 27, the block moves along the translation guide. Accordingly, the gantry 11 moves along the vertical direction.

Under the control of the move control circuitry 27, the gantry move mechanism 14 causes the block to move along the translational guide that is arranged along the vertical direction, thereby causing the gantry 11 to move. This enables the gantry 11 to move up and down along the vertical direction. Note that the mechanism relating to move of the gantry 11 along the vertical direction is not limited to a translational guide, and the mechanism may be realized using, for example, a known mechanism, such as a rack and pinion.

As illustrated in FIGS. 1 to 3, the diameter of the bearing 16 is equal in magnitude to the thickness of the scanner unit 11, that is, the thickness of the gantry 11 along the Y-direction (the length of the gantry 11 along the opening 15 in the gantry 11 in the vertical direction). This makes it possible to maximize the diameter of the bearing 16 within a range in which the diameter does not exceed the thickness of the scanner unit 11. The bearing 16 includes an inner ring 161, a plurality of rolling elements 163, an outer ring 165, and a plurality of teeth (also referred to as a gear) 167. The inner ring 161, for example, has a plurality of attachment holes (not illustrated in the drawings) along a direction of rotation of the rolling elements 163. The inner ring 161 is connected to the scanner unit (the gantry 11) with bottles penetrating the attachment holes. The inner ring 161 includes the teeth 167 on an inner circumferential surface of the inner ring 161. In other words, the inward teeth ("internal teeth" below) 167 are arranged in the opening in the bearing 16.

The rolling elements 163 are held by, for example, a retainer. The rolling elements 163 connect the inner ring 161 and the outer ring 165 rotatably. Known rolling elements, such as balls or rollers, are usable as the rolling elements 163.

The outer ring 165 is connected to the outer circumference of the inner ring 161 via the rolling elements 163. In the outer ring 165, the stand 13 is connected to a side opposite to the scanner unit 11 ("scanner opposed side" below). Specifically, the outer ring 165, for example, has a plurality of attachment holes (not illustrated in the drawings) along the direction of rotation of the rolling elements 163. The gantry move mechanism 14 is connected to the outer ring 165 with bolts penetrating the attachment holes on the scanner opposed side of the outer ring 165. For example, the outer ring 165 is connected to the gantry move mechanism 14 with the bolts penetrating the attachment holes via a member that is connected to the block in the gantry move mechanism 14. For example, the bolts penetrating the attachment holes connect the outer ring 165 to the gantry move mechanism 14 via a member that is connected to the block in the gantry move mechanism 14. A plate, or the like, is usable as appropriate as the member according to the positional relationship between the translational guide and the attachment holes. The bearing 16 including the internal teeth 167 may be also referred to as a slewing bearing or a slewing ring bearing.

The driver 18 that causes the inner ring 161 to rotate via the teeth 167 via the teeth 167 in the bearing 16 is mounted on the gantry move mechanism 14. The driver 18 includes the driver gear 181, a driver shaft 183, and a driver motor 185. The driver gear 181 is engaged with the teeth (internal teeth) 167. As illustrated in FIG. 3, the driver gear 181 is housed within the inner circumference of the bearing 16. As illustrated in FIG. 1 and FIG. 3, the driver gear 181 is connected to the driver shaft 183 serving as a rotation axis of the driver motor 185 via various types of gears that cause a given torque, or the like.

The driver shaft 183 is extended from the driver gear 181 toward the scanner opposed side to the driver motor 185. The driver shaft 183 connects a rotation axis of the driver motor 185 and a rotation axis of the driver gear 181. The driver motor 185 rotates the driver shaft 183, thereby driving the driver gear 181 to rotate. As illustrated in FIGS. 1 to 3, the teeth 167 and the driver gear 181 are arranged in an opening part in the bearing 16, that is, the space on the side of the inner circumference of the inner ring 161. The driver motor 185 is mounted on the gantry move mechanism 14. Thus, the driver 18 moves in the vertical direction together with the bearing 16 along the vertical direction of the gantry 11.

Under the control of the move control circuitry 27, the driver 18 causes the internal teeth 167 to rotate using rotation of the driver gear 181. In other words, the teeth 167 in the bearing 16 rotates because of driving by the driver motor 185 under the control of the move control circuitry 27. Accordingly, the driver 18 causes the gantry 11 to rotate between the vertical direction and the horizontal direction.

Rotation of the gantry 11 enables switching between the standing position imaging state and the spine position imaging state. Thus, the gantry 11 is rotatable using the X-axis in FIGS. 1 to 3 as the rotation axis and is movable along the vertical direction. The gantry move mechanism 14, the bearing 16, and the driver 18 may be referred to as a movability unit that relates to movability of the gantry 11. The movability unit is connected to the stand 13.

For example, when the spine imaging is performed on the subject P, the driver motor 185 in the driver 18 causes the driver shaft 183 to rotate under the control of the move control circuitry 27 such that the plane of the opening 15 is perpendicular to the vertical direction. Accordingly, the driver gear 181 rotates. The teeth 167 rotate in association with rotation of the driver gear 181 and the gantry 11 rotates. After the subject P lies on a tabletop 43, the couch drive apparatus 42 causes the tabletop 43 to move, thereby enabling the spine position imaging on the subject P as in the case of a normal X-ray CT apparatus.

When the standing position imaging is performed on the subject P, the driver motor 185 in the driver 18 causes the driver shaft 183 to rotate under the control of the move control circuitry 27 such that the plane of the opening 15 is horizontal. Accordingly, the driver gear 181 rotates. The teeth 167 rotate in association with rotation of the driver gear 181 and the gantry 11 rotates. Driving by the vertical driver motor under the control of the move control circuitry 27 then causes the block to move up in the vertical direction. Accordingly, the gantry 11 moves up in the vertical direction to a position in which the subject P can stand right under the opening 15. When the subject P is positioned right under the opening 15, the block moves along the vertical direction because of driving by the vertical move motor under the control of the move control circuitry 27 according to an instruction of the user via an input interface 105. In this manner, the gantry 11 moves up and down and thereby the standing position imaging on the subject P is executed as appropriate.

The X-ray tube 17 is a vacuum tube in which a high voltage is applied from the high-voltage generator 31 and a filament current is supplied and thus thermoelectrons are applied from a cathode (filament) to an anode (target) and accordingly X-rays are generated. The thermoelectrons collide with the target, so that X-rays are generated. The X-rays that are generated at a tube focal spot in the X-ray tube 17 are formed into a cone beam form via, for example, a collimator and are applied to the subject P. For example, there is, as the X-ray tube 17, a rotating anode X-ray tube that generates X-rays by applying thermoelectrons to the rotating anode. Note that the first embodiment is applicable to both a single-source X-ray CT apparatus and an X-ray CT apparatus in which a plurality of pairs of the X-ray tube 17 and the X-ray detector 19 are mounted on the rotation frame 21, that is, a multi-source X-ray CT apparatus.

The X-ray detector 19 detects the X-rays that are applied from the X-ray tube 17 and that pass through the subject P and outputs an electric signal corresponding to the X-ray dosage to the DAS 33. The X-ray detector 19, for example, includes a plurality of detection element rows in which a plurality of detection elements are arrayed in a channel direction along an arc about a focal spot of the X-ray tube 17. The X-ray detector 19, for example, has a configuration in which a plurality of the detection element rows are arrayed in a slice direction (a row direction). There are, as the X-ray CT apparatus 1, a Rotate/Rotate-Type (a third-generation CT) in which the X-ray tube 17 and the X-ray detector 19 rotate around the subject P as a unit and a Stationary/Rotate-Type (a fourth-generation CT) in which a large number of X-ray detection elements that are arrayed into a ring shape are fixed and only the X-ray tube 17 rotates around the subject P and any of the types is applicable to the first embodiment. For specific description, the third generation CT is exemplified and described as the X-ray CT apparatus 1 of the first embodiment.

The X-ray detector 19 is, for example, an indirect transformation detector including a grid, a scintillator array, and an optical sensor array. The scintillator array includes a plurality of scintillators and the scintillator includes a scintillator crystal that outputs light of a photon quantity corresponding to the dosage of incident X-rays. The grid is arranged on a surface of the scintillator array on the side of incidence of X-rays and includes an X-ray shield having a function of absorbing scattering X-rays. The grid is sometimes referred to as a collimator (one-dimensional collimator or a two-dimensional collimator). An optical sensor array has a function of transformation into an electric signal corresponding to the amount of light from the scintillator and, for example, includes an optical sensor, such as a photomultiplier (PMT). The X-ray detector 19 may be a direct transformation detector including a semiconductor device that transforms incident X-rays into an electric signal. The X-ray detector 19 may be a photon counting X-ray detector. The X-ray detector 19 is an example of an X-ray detector.

The rotation frame 21 has the opening 15 and the X-ray tube 17 that generates X-rays is attached to the rotation frame 21. Specifically, the rotation frame 21 is an annular frame that supports the X-ray tube 17 and the X-ray detector 19 such that the X-ray tube 17 and the X-ray detector 19 are opposed to each other and that is caused by the gantry control apparatus 25 to rotate the X-ray tube 17 and the X-ray detector 19. The rotation frame 21 is rotatably supported on the main frame 12 via a support bearing. The rotation frame 21 is subject to the power from the rotation drive apparatus 23 under the control of the gantry control apparatus 25 and rotates on the rotation axis A1 at a given angular speed Note that the rotation frame 21 further includes and supports the high-voltage generator 31 and the DAS 33 in addition to the X-ray tube 17 and the X-ray detector 19. The rotation frame 21 is housed in an approximately cylindrical casing in which the opening 15 forming the imaging space is formed. A center axis of the opening 15 coincides with the rotation axis A1 of the rotation frame 21. Detection data that is generated by the DAS 33, for example, is transmitted by optical communication from a transmitter that has a light emitting diode (LED) to a receiver that has a photodiode and that is provided in a non-rotation part (for example, the main frame 12) of the gantry apparatus 10 and is transferred to the console apparatus 100. Note that a method of transmitting the detection data from the rotation frame 21 to the non-rotation part of the gantry apparatus 10 is not limited to optical communication described above, and any system may be employed as long as the system is of non-contact data transmission.

The rotation drive apparatus 23 generates a power for causing the rotation frame 21 to rotate according to control of the gantry control apparatus 25. The rotation drive apparatus 23 is driven at a rotation speed corresponding to a duty ratio of a drive signal from the gantry control apparatus 25, or the like, thereby generating a power. The rotation drive apparatus 23, for example, is realized using a motor, such as a direct driver motor or a servo motor. The rotation drive apparatus 23, for example, is housed in the gantry 11.

The gantry control apparatus 25 controls the high-voltage generator 31, the rotation drive apparatus 23, the move control circuitry 27, the DAS 33, and the like according to an instruction from the console apparatus 100. On receiving an input signal from the input interface that is attached to the console apparatus 100 or the gantry apparatus 10, the gantry control apparatus 25 has a function of performing operation control on the gantry apparatus 10. For example, the gantry control apparatus 25 performs control of causing the rotation frame 21 to rotate on receiving an input signal or control of causing the gantry apparatus 10 to tilt. The gantry control apparatus 25 may be provided on the stand 13 in the gantry apparatus 10 or may be provided in the console apparatus 100. The function that is implemented by the gantry control apparatus 25 may be installed as a gantry control function in processing circuitry 107 in the console apparatus 100.

The gantry control apparatus 25 includes, as hardware resources, a processor, such as a central processing unit (CPU) or a micro processing unit (MPU), and a memory, such as a read only memory (ROM) or a random access memory (RAM). The gantry control apparatus 25 may be realized using an application specific integrated circuit (ASIC), a field programmable gate array (FPGA), another complex programmable logic device (CPLD), or a field programmable gate array (FPGA, or a simple programmable logic device (SPLD).

The processor reads a program that is saved in the memory and executes the program, thereby implementing the above-described function. Instead of saving the program in the memory, the program may be directly installed in the circuitry of the processor. In this case, the processor reads the program installed in the circuitry and executes the program, thereby implementing the above-described function.

When an instruction to realize the standing position imaging in which the direction of the opening 15 is the vertical direction is input as an instruction of the user via an operation panel 29, or the like, the move control circuitry 27 causes the driver gear 181 to rotate by controlling the driver 18, thereby causing the internal teeth 167 to rotate. Because of rotation of the internal teeth 167, the gantry 11 rotates from the horizontal direction to the vertical direction. When an instruction to realize the spine position imaging in which the direction of the opening 15 is the horizontal direction is input as an instruction of the user via the operation panel 29, or the like, the move control circuitry 27 causes the driver gear 181 to rotate by controlling the driver 18, thereby causing the internal teeth 167 to rotate. Because of rotation of the internal teeth 167, the gantry 11 rotates from the vertical direction to the horizontal direction. When the user inputs a tilt angle via the operation panel 29, or the like, the move control circuitry 27 causes the driver gear 181 to rotate by controlling the driver 18, thereby causing the internal teeth 167 to rotate. Because of rotation of the internal teeth 167, the gantry 11 rotates to realize the input tilt angle.

In the standing position imaging, when the user inputs an instruction to move the gantry 11 via the operation panel 29, or the like, the move control circuitry 27 controls the vertical move motor, thereby causing the block of the gantry move mechanism 14 to move. Accordingly, the gantry 11 moves along the vertical direction.

The move control circuitry 27 is realized by the above-described processor, or the like. The processor that realizes processes of various types of move control that are executed by the move control circuitry 27 corresponds to a move control unit. According to FIG. 1, the move control circuitry 27 is mounted on the stand 13; however, the move control circuitry 27 may be mounted on the console apparatus 100. The function that is implemented by the move control circuitry 27 may be installed in the processing circuitry 107 as a move control function or may be installed in the gantry control apparatus 25.

The operation panel 29 is realized using a touch pad via which an input operation is made by making contact with an operation screen, a touch panel display that is an integration of a display screen and a touch pad. The operation panel 29 converts an input operation received from the user into an electric signal and outputs the electric signal to the gantry control apparatus 25. The operation panel 29 receives a selection operation of selecting a standing position mode that relates to image capturing on the subject P in the standing position or a spine position mode that relates to image capturing on the subject in the spine position. The operation panel 29 is provided in, for example, the stand 13.

The high-voltage generator 31 includes electric circuitry, such as a transformer and a rectifier, and generates a high voltage to be applied to the X-ray tube 17 and a filament current to be supplied to the X-ray tube 17. The high-voltage generator 31 controls an output voltage corresponding to the X-rays that are applied by the X-ray tube 17. The high-voltage generator 31 may be a transformer type or an inverter type. The high-voltage generator 31 may be provided in the rotation frame 21 or may be provided on the side of the main frame 12 of the gantry 11.

The wedge (not illustrated in the drawings) is a filter for adjusting the dosage of X-rays applied from the X-ray tube 17. Specifically, the wedge is a filter that transmits and attenuates the X-rays applied from the X-ray tube 17 such that the X-rays applied to the subject P from the X-ray tube 17 have a predetermined distribution. The wedge is, for example, a wedge filter or a bow-tie filter and is a filter obtained by processing aluminum into a given target angle and a given thickness.

The collimator not illustrated in the drawings is a lead plate for narrowing the X-rays transmitted through the wedge into an X-ray irradiation area, or the like, and forms a slit according to combination of a plurality of lead plate.

The DAS 33 includes an amplifier that performs amplification processing on the electric signal that is output from each of the X-ray detection elements of the X-ray detector 19 and an A/D converter that converts the electric signal into a digital signal and generates detection data. The detection data that is generated by the DAS 33 is transferred to the console apparatus 100.

The table apparatus 40 is an apparatus on which the subject P to be scanned is laid and that moves the subject P and includes a base 41, a couch drive apparatus 42, the tabletop 43, and a tabletop support frame 44. The base 41 is a casing that supports the tabletop support frame 44 movably in the vertical direction. The couch drive apparatus 42 is a motor or an actuator that causes the tabletop 43 on which the subject P is laid in a longitudinal direction of the tabletop 43. The couch drive apparatus 42 moves the tabletop 43 according to control by the console apparatus 100. The tabletop 43 that is provided on an upper surface of the tabletop support frame 44 is a plate on which the subject P is laid. The couch drive apparatus 42 may move, in addition to the tabletop 43, the tabletop support frame 44 in the longitudinal direction of the tabletop 43.

The console apparatus 100 includes a memory 101, a display 103, the input interface 105, and the processing circuitry 107. Data communication between the memory 101, the display 103, the input interface 105, and the processing circuitry 107 is performed via, for example, a bus.

The memory 101 is a memory, such as a hard disk drive (HDD), a solid state drive (SSD), or an integrated circuit memory. The memory 101 stores, for example, projection data and reconstruction image data. The memory 101 may be a drive apparatus that reads or writes various sets of information between a portable storage medium, such as a compact disc (CD), a digital versatile disc (DVD), or a flash memory, and a semiconductor memory device, such as a random access memory (RAM). The storage of the memory 101 may be in an external memory that is connected via a network. The memory 101 stores a control program according to the first embodiment. The memory 101 stores volume data that is generated by a pre-rescan or a main scan, etc.

The display 103 displays various types of information. For example, the display 103 outputs a medical image (CT image) that is generated by the processing circuitry 107 and a graphical user interface (GUI) for receiving various types of operations from the user. It is possible to appropriately use, as the display 103, for example, a liquid crystal display (LCD), a cathode ray tube (CRT) display, an organic electro luminescence display (OELD), a plasma display, or any other display. The display 103 may be provided in the gantry apparatus 10. The display 103 may be a desktop display or may be configured using a tablet terminal device capable of radio communication with the console apparatus 100, etc. The display 103 corresponds to a display unit.

The input interface 105 receives various types of input operations from the user, converts the received input operations into electric signals, and outputs the electric signals to the processing circuitry 107. For example, the input interface 105 receives, from the user, a collection condition on collecting projection data, a reconstruction condition on reconstructing CT image data, and an image processing condition on generating a post processing image from a CT image. For example, a mouse, a keyboard, a trackball, a switch, a button, a joystick, a touch pad, and a touch panel display are usable appropriately as the input interface 105.

In the first embodiment, the input interface 105 is not limited to one including physical operational parts, such as a mouse, a keyboard, a track ball, a switch, a button, a joystick, a touch pad, and a touch panel display. For example, examples of the input interface 105 include electric signal processing circuitry that receives an electric signal corresponding to an input operation from an external input device that is provided independently of the apparatus and that outputs the electric signal to the processing circuitry 107. The input interface 105 is an example of an input unit. The input interface 105 may be provided in the gantry apparatus 10. The input interface 105 may be configured using a tablet terminal device capable of radio communication with the main unit of the console apparatus 100, or the like. The input interface corresponds to the input unit.

The processing circuitry 107 controls entire operations of the X-ray CT apparatus 1 according to electric signals of input operations that are output from the input interface 105. For example, the processing circuitry 107 includes, as hardware resources, a processor, such as a CPU, a MPU or a graphics processing unit (GPU), and a memory, such as a ROM or a RAM. Using a processor that executes a program that is loaded into the memory, the processing circuitry executes a system controlling function 111, a pre-processing function 113, a reconstructing function 115, and an image processing function 117.

The processing circuitry 107 that executes each of the system controlling function 111, the pre-processing function 113, the reconstructing function 115, and the image processing function 117 corresponds to a system control unit, a pre-processing unit, an image generation unit, and an image processing unit. Each of the system controlling function 111, the pre-processing function 113, the reconstructing function 115, and the image processing function 117 is not limited to the case where the function is implemented using a single set of processing circuitry. A plurality of independent processors may be combined to configure processing circuitry and the respective processors may execute programs, thereby implementing the system controlling function 111, the pre-processing function 113, the reconstructing function 115, and the image processing function 117.

By the system controlling function 111, the processing circuitry 107 controls each of the functions of the processing circuitry 107 according to input operations that are received from the user via the input interface 105. Specifically, the system controlling function 111 reads a control program that is stored in the memory 101, loads the control program into the memory in the processing circuitry 107, and controls each unit of the X-ray CT apparatus 1 according to the loaded control program. For example, the processing circuitry 107 control each of the functions of the processing circuitry 107 according to input operations that are received from the user via the input interface 105.

By the pre-processing function 113, the processing circuitry 107 generates data obtained by performing pre-processing, such as logarithmic transformation processing, offset correction processing, sensitivity correction processing between channels, and beam hardening correction, on the detection data that is output from the DAS 33. Data before the pre-processing is referred to as raw data and data after the pre-processing is referred to as projection data.

By the reconstructing function 115, the processing circuitry 107 generates CT image data by performing reconstruction processing using filtered back projection (FBP method) and successive approximation on the projection data that is generated by the pre-processing function 113. In other words, the reconstructing function 115 generates an image based on the output from the imaging system. The reconstructing function 115 stores data of the reconstructed CT image in the memory 101.

By the image processing function 117, the processing circuitry 107 performs various sets of image processing on the CT image that is reconstructed by the reconstructing function 115. For example, the image processing function 117 performs three-dimensional image processing, such as volume rendering, surface volume rendering, image value projection processing, multi-planer reconstruction (MPR) processing, and curved MPR (CPR) processing, on the CT image, thereby generating a display image.

The X-ray CT apparatus 1 according to the first embodiment described above includes the scanner unit 11 that rotatably supports the rotation unit 21 on which the X-ray tube 17 is mounted; the bearing 16 that is connected to the scanner unit 11 and that includes the inner ring 161 having the teeth 167 on the inner circumferential surface and the outer ring 165 that is connected to the outer circumference of the inner ring 161 via the rolling elements 163; the driver 18 that causes the inner ring 161 to rotate via the teeth 167; and the stand 13 that has the driver 18 being mounted thereon, that is connected to the outer ring 165, and that is provided on the floor surface FL. The stand 13 in the X-ray CT apparatus 1 according to the first embodiment is connected to the outer ring 165 and includes the gantry move mechanism 14 allowing the driver 18 to move in the vertical direction together with the outer ring 165. The driver 18 in the X-ray CT apparatus 1 according to the first embodiment includes the driver gear 181 that is engaged with the teeth 167 and the driver motor 185 that drives the driver gear 181 to rotate, the driver motor 185 is mounted on the stand 13, and the driver gear 181 is arranged in the opening of the inner ring 161 (the opening in the bearing 16).

Figure 7:
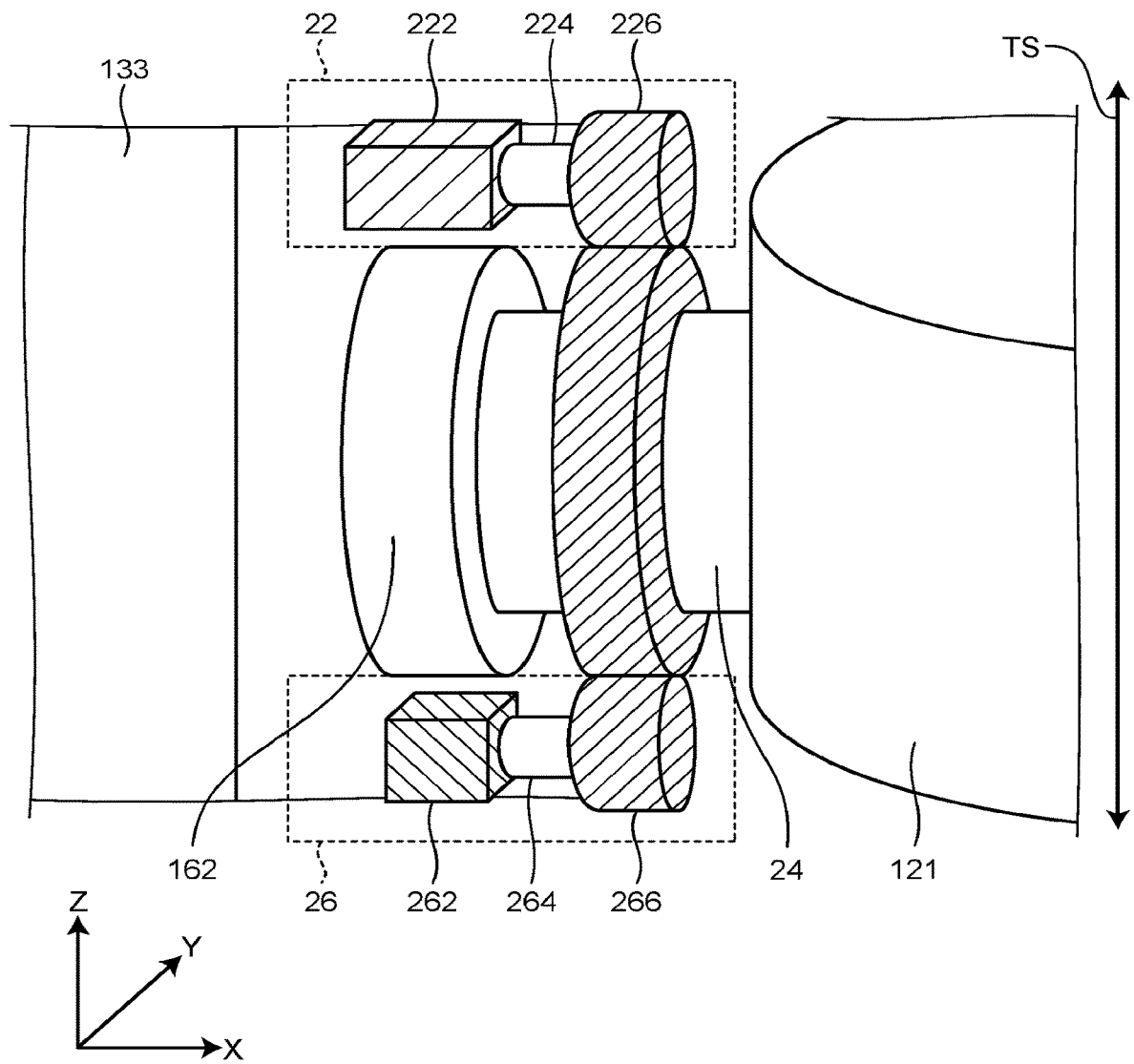
FIG. 7 is a diagram that relates to the conventional technique.

Thus, in the X-ray CT apparatus 1 according to the first embodiment, the bearing 16 having the teeth 167 (also referred to as "inner ring gear") is employed as the bearing 16 and the driver 18 is arranged on the side of the inner circumference of the bearing 16 and accordingly the driver 18 is housed within the inner circumference of the bearing 16. For this reason, it is possible to design the bearing 16 and the driver 18 compactly in the X-ray CT apparatus 1 according to the first embodiment. In addition to this, according to the X-ray CT apparatus 1 according to the first embodiment, it is possible to set the length of the diameter of the bearing 16 at the thickness of the scanner unit 11, that is, the length of the scanner unit 11 along the Y-direction illustrated in FIG. 2 and FIG. 3 and maximize the diameter of the bearing 16 within a range in which the diameter does not exceed thickness of the scanner unit 11. As for the size of the stand 13, it is possible to design the stand in a size equivalent to the size in the conventional case where an external gear in FIG. 7 is used.

Thus, according to the X-ray CT apparatus 1 according to the first embodiment, because of installation of arrangement of the bearing 16 having the internal teeth 167 and the driver 18 on the side of the inner circumference of the bearing 16, the thickness formed by the bearing 16 and the driver 18 does not exceed the thickness of the scanner unit 11 and it is possible to maximize the diameter of the mearing 16 to a size equal to the thickness of the scanner unit 11. Thus, according to the X-ray CT apparatus 1 according to the first embodiment, it is possible to realize the one-side-holding CT apparatus in which the size of the stand 13 is equivalent to that of the conventional technique and that enables both the standing position imaging and the spine position imaging. According to the X-ray CT apparatus 1 according to the first embodiment, because the X-ray CT apparatus 1 holds and supports the gantry on one side, the X-ray CT apparatus 1 is more compact than the X-ray CT apparatus in which a plurality of stands support the gantry 11, which enables cost reduction because of a smaller number of parts and an improvement in maintenance because of a small number of parts. According to the X-ray CT apparatus 1 according to the first embodiment, because the apparatus is a one-side-holding CT apparatus with high visibility of the subject P in the standing position imaging and high convenience in moving the subject P from a stretcher to the tabletop 43, it is possible to improve a throughput of an examination on the subject P, that is, increase an examination efficiency.

Second Embodiment

Figure 4:
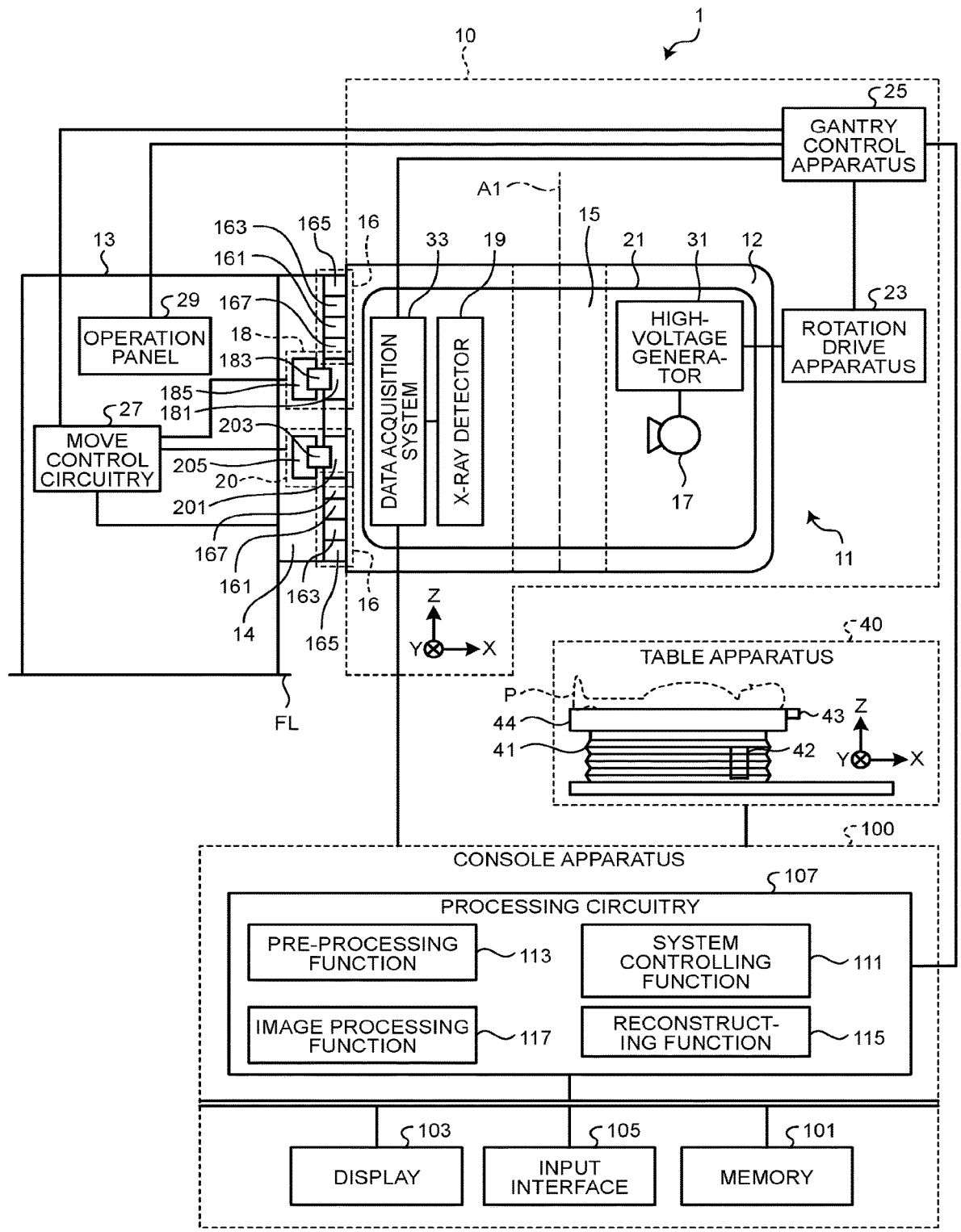
FIG. 4 is a diagram illustrating an example of a configuration of an X-ray CT apparatus according to a second embodiment.

A second embodiment is in further including, in addition to the configuration of the first embodiment, a holder that holds the internal teeth 167 and thereby inhibits rotation of the internal teeth 167. FIG. 4 is a diagram illustrating an example of a configuration of the X-ray CT apparatus 1 according to the second embodiment. As illustrated in FIG. 4, a holder 20 is mounted on the stand 13. The holder 20 holds the inner ring 161 in the bearing 16 via the teeth (internal teeth) 167 and inhibits rotation of the inner ring 161. The holder 20 may be also referred to as a brake. A configuration of the second embodiment different from the first embodiment will be described below.

Figure 5:
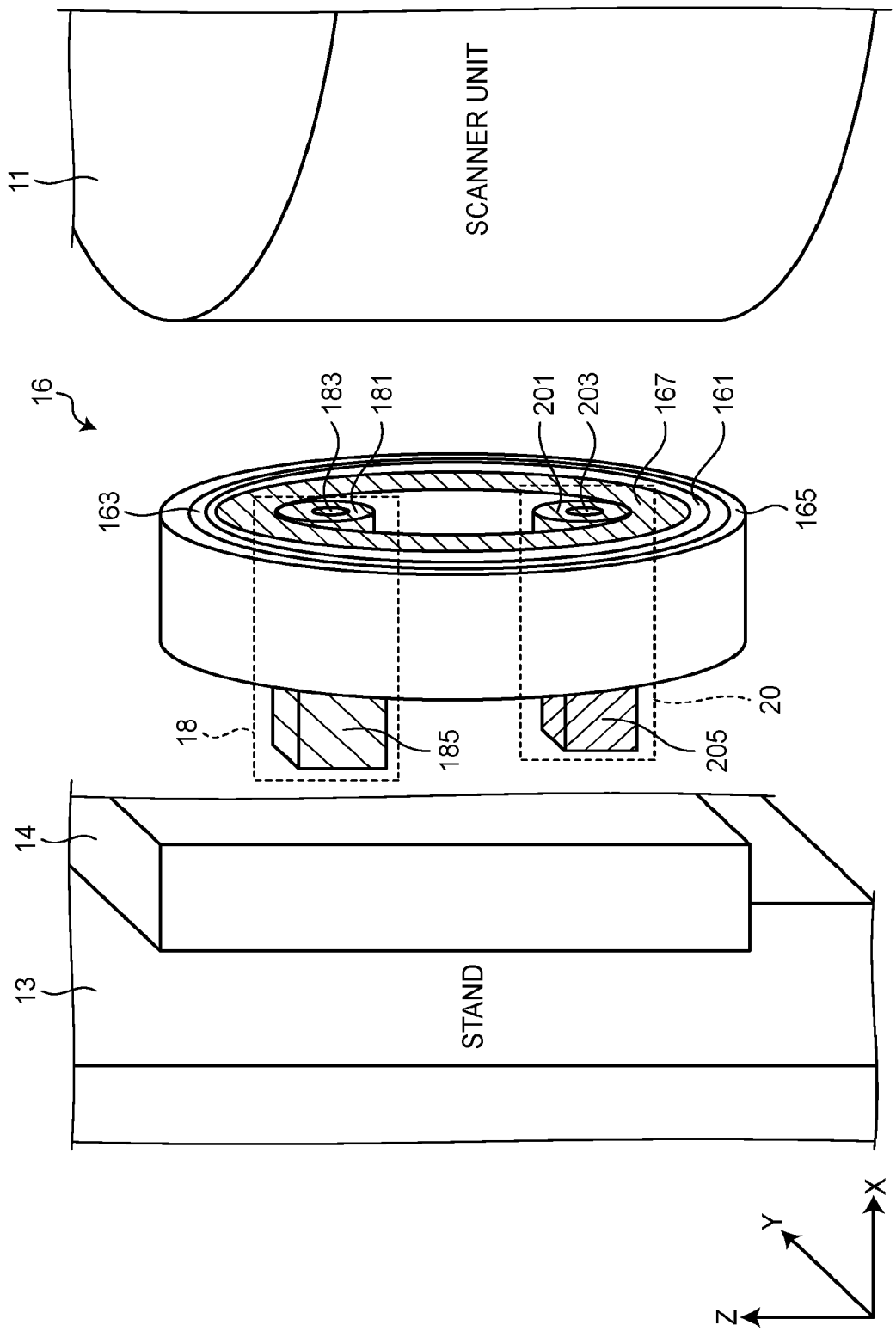
FIG. 5 is a perspective view illustrating an example of a positional relationship between a gantry, a stand, a gantry move mechanism, a bearing, a driver, and a holder according to the second embodiment.
Figure 6:
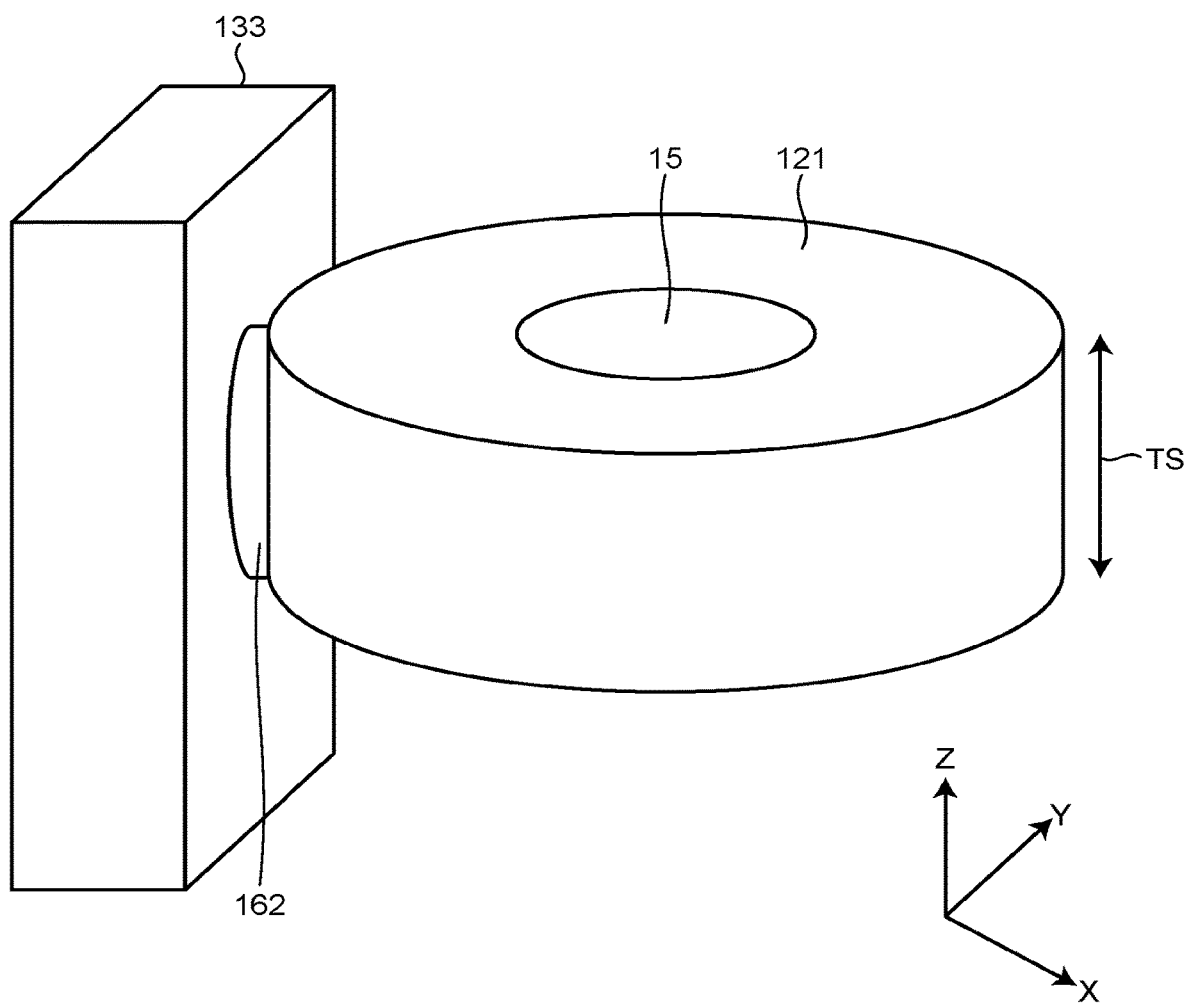
FIG. 6 is a diagram that relates to a conventional technique.

FIG. 5 is a perspective view illustrating an example of a positional relationship between the gantry 11, the stand 13, the gantry move mechanism 14, the bearing 16, the driver 18, and the holder 20. For easy understanding of the positional relationship, FIG. 5 illustrates the stand 13, the gantry move mechanism 14, the bearing 16, and the gantry 11 separately. According to FIG. 5, the driver gear 181 in the driver 18 and a holder gear 201 in the holder 20 are engaged with the internal teeth 167 on both ends in the vertical direction; however, the engagement is not limited thereto. The position of engagement between the driver gear 181 and the holder gear 201 can be set in any position as long as the position is within a space that is surrounded by the internal teeth 167. It is an essential condition here that the driver gear 181 and the holder gear 201 do not interfere with each other.

The holder 20 that inhibits rotation of the inner ring 161 is mounted on the gantry move mechanism 14 in addition to the driver 18 via the teeth 167 in the bearing 16. The holder 20 includes the holder gear 201, a holder shaft 203, and a holder motor 205. The holder 20 may be realized using a known disk brake or a known drum brake. For example, when a disk brake is used as the holder 20, the inner ring 161 is further provided with a circular disk.

The holder gear 201 is engaged with the teeth (internal teeth 167). As illustrated in FIG. 5, the holder gear 201 is housed within the inner circumference of the bearing 16. In other words, the holder gear 201 is arranged in the opening of the inner ring 161. As illustrated in FIG. 5, the holder gear 201 is connected to the holder shaft 203 serving as a rotation axis of the holder motor 205 via various types of gears that causes that cause a given torque, or the like.

The holder shaft 203 is extended from the holder gear 201 toward the scanner opposed side to the holder motor 205. The holder shaft 203 connects a rotation axis of the holder motor 205 and a rotation axis of the holder gear 201.

The holder motor 205 is mounted on the stand 13. Specifically, as illustrated in FIG. 5, the holder motor 205 is mounted on the gantry move mechanism 14 in the stand 13. The holder motor 205 rotates the holder shaft 203, thereby driving the holder gear 201 to rotate. As illustrated in FIG. 5, the teeth 167 and the holder gear 201 are arranged in an opening part in the bearing 16, that is, the space on the side of the inner circumference of the inner ring 161. The holder motor 205 is mounted on the gantry move mechanism 14. Thus, the holder 20 moves in the vertical direction together with the bearing 16 along the vertical direction of the gantry 11.

Under the control of the move control circuitry 27, the holder 20 causes the holder shaft 203 to rotate such that the holder gear 201 makes contact with a tooth surface of the internal tooth 167 that is opposed to a point of contact (pitch point) between the internal tooth 167 and the driver gear 181 ("opposed tooth surface" below). In other words, because of driving by the holder motor 205 under the control of the move control circuitry 27, the internal teeth 167 of the bearing 16 make contact with the holder gear 201. During rotation of the gantry 11 between the horizontal direction and the vertical direction, the tooth of the holder gear 201 is caused to make contact with the opposed tooth surface and accordingly a backlash is inhibited. In other words, a backlash is inhibited in switching between the standing position imaging state and the spine position imaging state. The gantry move mechanism 14, the bearing 16, the driver 18, and the holder 20 may be referred to as a movability unit that relates to movability of the gantry 11.

The holder 20 in the X-ray CT apparatus 1 according to the second embodiment described above is mounted on the stand 13 and holds rotation of the inner ring 161 via the teeth 167. The stand 13 in the X-ray CT apparatus 1 according to the second embodiment is connected to the outer ring 165 and includes the gantry move mechanism 14 allowing the driver 18 and the holder 20 to move in the vertical direction together with the outer ring 165. The holder 20 in the X-ray CT apparatus 1 according to the second embodiment includes the holder gear 201 that is engaged with the teeth 167 and that is arranged in the opening of the inner ring 161 and the holder motor 205 that is mounted on the stand 13 and that drives the holder gear 201 to rotate.

Thus, in the X-ray CT apparatus 1 according to the second embodiment, the bearing 16 having the teeth 167 (also referred to as "inner ring gear") is employed as the bearing 16 and the driver 18 and the holder 20 are arranged on the side of the inner circumference of the bearing 16 and accordingly the driver 18 and the holder 20 are housed within the inner circumference of the bearing 16. For this reason, it is possible to design the bearing 16, the driver 18, and the holder 20 compactly in the X-ray CT apparatus 1 according to the second embodiment.

Thus, according to the X-ray CT apparatus 1 according to the second embodiment, because it is possible to inhibit a backlash associated with rotation of the internal teeth 167 when the gantry 11 rotates, it is possible to reduce degradation in image quality like motion artifacts in an image that relates to the subject P. Other effects according to the second embodiment are similar to those of the first embodiment and thus description thereof will be omitted.

Description has been provided, assuming gears as the internal teeth 167, the driver gear 181, and the holder gear 201; however, the embodiment is not limited thereto. As for the driver gear 181 and the holder gear 201, for example, a contact transmission mechanism using a pulley, or the like, may be used as a modification of the embodiment.

According to at least one of the embodiments described above, it is possible to realize the one-side-held X-ray CT apparatus 1 in which strokes of the scanner unit 11 along the vertical direction are improved, the diameter of the bearing 16 capable of supporting the moment load of the scanner 11 is ensured, and the size of the stand 13 can be reduced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An X-ray computer tomographic apparatus comprising:
    a gantry that rotatably supports a rotation unit on which an X-ray tube is mounted;
    a bearing that is connected to the gantry and that includes an inner ring with a plurality of teeth on an inner circumferential surface and an outer ring that is connected to an outer circumference of the inner ring via a plurality of rolling elements;
    a driver that causes the inner ring to rotate via the teeth; and
    a stand on which the driver is mounted, that is connected to the outer ring, and that is provided on a floor surface.

2. The X-ray computer tomographic apparatus according to claim 1, further comprising a holder that is mounted on the stand and that inhibits rotation of the inner ring via the teeth.

3. The X-ray computer tomographic apparatus according to claim 2, wherein the stand is connected to the outer ring and includes a gantry move mechanism that allows the driver and the holder to move in a vertical direction together with the outer ring.

4. The X-ray computer tomographic apparatus according to claim 2, wherein
    the driver includes a driver gear that is engaged with the teeth and a driver motor that drives the driver gear to rotate,
    the driver motor is mounted on the stand,
    the driver gear is arranged in an opening of the inner ring,
    the holder includes a holder gear that is engaged with the teeth and a holder motor that drives the holder gear to rotate,
    the holder motor is mounted on the stand, and
    the holder gear is arranged in the opening of the inner ring.

5. The X-ray computer tomographic apparatus according to claim 4, wherein the driver gear and the holder gear do not interfere with each other.

* * * * *